(12) United States Patent
Roeck

(10) Patent No.: US 7,372,971 B2
(45) Date of Patent: May 13, 2008

(54) HEARING DEVICE WITH FUEL CELL

(75) Inventor: Hans-Ueli Roeck, Hombrechtikon (CH)

(73) Assignee: Phonak AG, Stafa (CH)

( * ) Notice: Subject to any disclaimer, the term of this patent is extended or adjusted under 35 U.S.C. 154(b) by 430 days.

(21) Appl. No.: 10/755,214

(22) Filed: Jan. 12, 2004

(65) Prior Publication Data
US 2005/0152568 A1 Jul. 14, 2005

(51) Int. Cl.
*H04R 25/00* (2006.01)
(52) U.S. Cl. ............... 381/323; 381/322; 381/324
(58) Field of Classification Search ........ 381/322–324, 381/330, 328; 429/72, 89, 96
See application file for complete search history.

(56) References Cited

U.S. PATENT DOCUMENTS 5,364,711 A 11/1994 Hasimoto et al.
6,567,527 B1* 5/2003 Baker et al. ............... 381/323
2001/0043709 A1* 11/2001 Panitzsch .................. 381/330
2004/0071306 A1* 4/2004 Kufner ...................... 381/323

FOREIGN PATENT DOCUMENTS

| | | |
|---|---|---|
| DE | 100 51 182 A1 | 2/2002 |
| DE | 101 15 429 A | 5/2002 |
| DE | 101 18 744 A | 10/2002 |
| GB | 1 534 015 A | 11/1978 |
| WO | 02/067628 A | 8/2002 |

* cited by examiner

*Primary Examiner*—Suhan Ni
(74) *Attorney, Agent, or Firm*—Pearne & Gordon LLP

(57) ABSTRACT

A hearing device is provided that includes at least a signal processing unit and at least a fuel cell to supply the signal processing unit with energy. The fuel tank of the fuel cell includes a membrane or an area with micro openings to let the fluid or gas to be used by the fuel cell pass into the fuel tank and to block other fluids from entering the fuel tank.

8 Claims, 3 Drawing Sheets

HEARING DEVICE WITH FUEL CELL

BACKGROUND OF THE INVENTION

This invention relates to a hearing device comprising at least a signal processing unit and at least a fuel cell to supply the signal processing unit with energy. Hearing devices may be e.g. behind-the-ear hearing aids or in-the-ear hearing aids or hearing instruments.

Hearing aids or hearing instruments are usually powered with batteries, namely zinc-air batteries, due to their relatively high energy-to-volume ratio. The availability and cost of these batteries are significant factors in the cost-of-ownership of hearing aids or hearing instruments however. That is the reason why accumulators are not used in large numbers due to their comparative low energy storage capacity. Although improvements in storage capacity in batteries as well as in accumulators are ongoing, no significant increases in view of factors or orders of magnitude can be expected.

Other means such as solar power (U.S. Pat. No. 5,303,305) or the use of body heat (DE 19 530 382) has been investigated, but such methods generate too little energy for a reasonable usage in hearing aids or hearing instruments.

The use of fuel cells for hearing instruments is described in DE 10 115 429 with low temperature fuel cells based on methanol as fuel. The benefit of this type of energy storage is based on its significantly higher capacity which allows either less refilling or more applications requiring higher power consumption.

Nevertheless, the fuel cell concept of DE 10 115 429 suffers from several disadvantages. If the fuel tank is arranged detachable from the fuel cell within the hearing device, mechanical connections are required, which are prone to break and space is needed for the connection elements, and furthermore electrical contacts are required, which are prone to oxidize. If the fuel cell is integrated in the hearing device, a spacious mechanical vent for refilling is required, as known from cigarette lighters, with the further disadvantage of being difficult to handle, especially for elderly people.

Furthermore, such a fuel tank needs to be made of at least partly transparent material in order to optically check its filling state. But even with transparent material, such an optical check needs a certain light condition with a certain minimum amount of ambient light for the recognition of the filling state. The transparent material must further be biocompatible for the use in hearing devices, especially for in-the-ear hearing devices, and has to be worked together with the other shell material.

To accurately estimate the filling state of the fuel cell, a regular shape of the tank is required, thereby limiting the degree of freedom for the integration of the tank within the small volume of a hearing device shell. A further problem is to be seen by surface tension effects on such small tank volumes, of miniaturized devices such as small hearing devices, which may mislead the user about the actual filling state.

SUMMARY OF THE INVENTION

It is an object of the present invention to improve the known issues of fuel cell technology to be used in hearing devices and to introduce a more user friendly system.

The present invention provides a hearing device comprising at least a signal processing unit and at least a fuel cell to supply the signal processing unit with energy, whereby the fuel tank of the fuel cell comprises a membrane or an area with micro openings to let the fluid or gas to be used by the fuel cell pass into the fuel tank and to block other fluids from entering the fuel tank. By using the membrane or the micro openings, the use of mechanical vents and the resulting drawbacks may be prevented. The refilling of fuel cells with such membranes or micro openings may be performed very easy and without the need of special knowledge or skill.

The membrane may be a hydro-/oleophobic grid or sheet respectively with very small openings and coated with nanoparticles. This will result in a surface tension with a contact angle greater then 90° for water and smaller then 90° for fuel fluids.

In one embodiment the membrane comprises a nanomechanical coating, achieving other fluids than the fuel fluid to be filled into the fuel tank to repel. The use of nanomechanical coating allows achieving the desired function of the membrane or micro openings with a high quality at efficient costs. Such coatings are described e.g. in DE 10051182.

In another embodiment of the invention, the micro openings are realized by a woven fabric used as a membrane.

Other semipermeable materials, as used in dialysis for the separation of small molecules from large molecules, may be used as well as membranes. Such an osmosis process is determined to balance the concentrations of a chemical substance on both sides of the membrane. The size of the micro openings will have to be adapted to the size of the molecules of he intended fuel fluid, whereas other molecules such as water molecules, shall not pass the membrane.

In one embodiment the fuel tank is arranged completely within the shell of the hearing device. The fuel tank may as well be incorporated in the fuel cell itself or be a separate part inside or outside of the shell of the hearing device.

In another embodiment the fuel tank and/or the fuel cell is arranged detachable from the hearing device. The fuel cell and/or the fuel tank may therefore easy be removed or replaced from the housing of the hearing device.

In another embodiment, the fuel tank is made out of flexible material allowing the shape and/or the volume of the fuel tank to alter. The walls of the fuel tank may be of a soft material, allowing the volume of the tank to increase or decrease. The usage of the fuel from the fuel cell may generate an under-pressure in the fuel tank, thereby decreasing the tank volume. This may help to refill the tank, especially if the soft material is of a kind of elastic material which may expand to its original shape during refilling of the tank.

In a further embodiment, the shape of the fuel tank is irregular, preferably formed to fill out the spare spaces or volumes respectively of the shell of the hearing device. Especially for in-the-ear hearing aids or completely-in-the-canal hearing aids, which have irregular shapes according to the individual shapes of the ear canals of the users of those instruments, this irregular shape allows the use of fuel cells in such instruments. The shape of the fuel cell or fuel tank respectively may be generated manually or automatically for each shell of hearing devices. The walls of such fuel cells or fuel tanks may be rigid or elastically flexible.

In a further embodiment, the fuel tank is made of a transparent or semitransparent material. This allows an optical measurement or estimation of the filling state of the fuel tank, either manually by eyes or automatically by optical sensors arranged in the vicinity of the fuel tank.

In a further embodiment, the membrane and/or areas with micro openings are arranged at least partly on the outer surface of the hearing device shell. This allows a simple refilling of the fuel tank without the need of opening the hearing device. The shell of the hearing device may simply be entered into a container containing the fuel required by the fuel cell, and the fuel will be transferred through the membrane or the micro openings into the fuel tank. At least only the part with the membrane or micro openings must be submerged into the fuel container, whereby the rest of the shell of the hearing device may be kept outside the fuel.

In a further embodiment, at least one electrical, mechanical, optical or electromechanical sensor is arranged to monitor the filling state of the fuel in the fuel tank. A compression sensor may be used in case of flexible fuel tank housing, a capacitive sensor in case of rigid or flexible fuel tank housing.

In a further embodiment, the capacitive sensor consists of two plates. This is very simple and only needs an additional pad on the signal processing unit, most commonly used in form of a chipset.

In a further embodiment, the plates of the capacitive sensor are sputtered onto the material of the fuel tank or the hearing device shell. The plates therefore may be sputtered onto the shell material of the fuel cell or fuel tank respectively or may be included during the manufacturing of the shell.

In a further embodiment, the sensor, especially the capacitive sensor, is connected to an oscillator to detect and evaluate changes in oscillation frequency. This reading of the sensor is generally evaluated by an electronic circuitry and may inform the user of the hearing device either automatically or on request in case the fuel tank is nearly empty. The information may be generated by acoustic means and may include specific beeps or a synthesized voice. Such an electronic circuitry may include mechanism to smooth out irregular readings caused by movements of the fuel fluid and may be connected or incorporated in the signal processing unit.

In a further embodiment, the plates of the sensor are incorporated within the shell and/or a printed circuit board and/or a semiconductor chip. The plates may thus already be integrated into those components during its production.

Instead of liquid fuel, a gaseous fuel like hydrogen taken up into solid mass may be used in the fuel cell. Then, but also in the afore mentioned configurations, the tank filling state may be conventionally measured by monitoring the voltage and/or the current drawn from the fuel cell over the time, assuming a known capacity and/or discharge behavior of the fuel cell.

The present invention further provides a method of filling a fuel tank of a hearing device comprising at least a signal processing unit, a receiver and a fuel cell to supply the signal processing unit or the receiver respectively with energy, whereby the fuel tank of the fuel cell comprises a membrane or an area with micro openings to let the fluid or gas to be used by the fuel cell pass into the fuel tank and to block other fluids from entering the fuel tank, by placing the hearing device into a refilling container with fuel fluid such as at least the membrane or area with micro openings are fully covered by the fuel fluid. As already stated, the fuel of the refilling container will penetrate through the membrane or the micro openings into the fuel tank of the fuel cell.

A further advantageous aspect by the use of a liquid fuel, such as methanol, is the purification effect of such liquids onto the shell of the hearing device. By entering the entire hearing device or at least a part of the hearing device into such a liquid fuel for refilling purposes, the surface of the hearing device will be cleaned from dirt, sweat, oily substances etc. Therefore, by regularly refilling the hearing device, it is at the same time cleaned and therefore in a substantially clean state, which diminishes a manual cleaning of the hearing device by the user and enhances the perceived state of appearance and quality of the hearing device. Such a refilling and cleaning process may take place overnight, thereby cleaning automatically at least the outside of the hearing device.

Further supporting cleaning measures, such as ultrasound generators, may be built into the refilling container to further enhance the cleaning process during the refilling process.

In a preferred embodiment, the method will be performed by applying an overpressure in the fuel of the refilling container. This results in an accelerated partial refilling within a short time, preferably a few minutes, allowing the hearing device to be used again for at least a few hours in case of a low fuel state of the fuel cell already during the day.

In a further embodiment, the method will be performed by applying a voltage difference between the refilling container and the fuel tank as well as by applying ionization of the fuel in the refilling container. This will force the fuel molecules to pass the membrane or micro openings into the fuel tank of the fuel cell.

The present invention further provides a method of cleaning the outside of hearing devices by applying fuel fluid or gas to the outside of the hearing device. In a further embodiment, the hearing device will be drowned at least partly or completely into the fuel fluid. Thus, the fuel cell of the hearing device may be refilled and at the same time the shell of the hearing device will be cleaned.

In a further embodiment, the output of an ultrasound generator will be applied within the fuel fluid. This will improve the cleaning process of the shell of the hearing device.

DESCRIPTION OF THE DRAWINGS

For purpose of facilitating and understanding of the invention, there is illustrated in the accompanying drawings a preferred embodiment thereof to be considered in connection with the following description. Thus the invention may be readily understood and appreciated.

DESCRIPTION OF A PREFERRED EMBODIMENT

Figure 1:
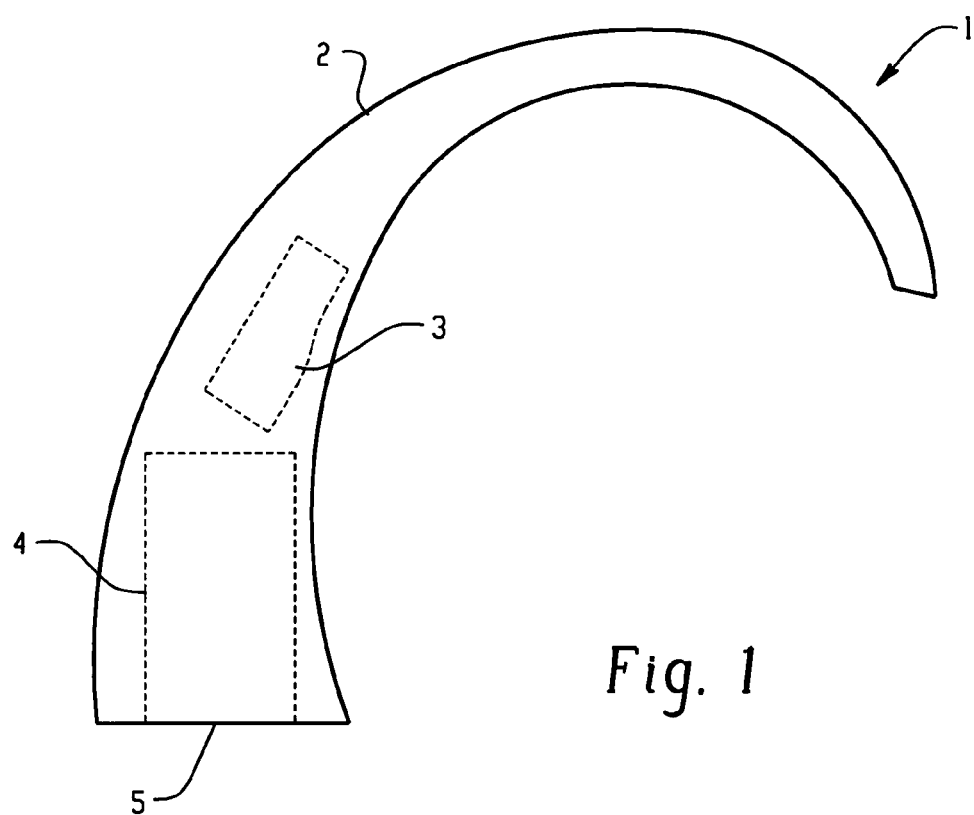
FIG. 1 is a schematical view of a hearing device in form of a behind-the-ear hearing aid with a fuel cell.

Referring to FIG. 1, a hearing device in form of a behind-the-ear hearing aid 1 with its shell 2 comprising a signal processing unit 3 is shown. The signal processing unit 3 is usually connected to further elements such as microphones, input and output amplifiers, receivers and so forth. The signal processing unit 3 will be powered by a fuel cell 4, which is arranged at the bottom end of the shell 2. The fuel cell 4 is preferably detachable inserted within an appropriate opening in the shell 2 and may therefore be removed or replaced by another fuel cell 4.

The fuel cell 4 may be based on methanol as fuel and may have its fuel tank incorporated in the cell housing itself. Such a fuel cell 4 will create electrical energy by a reaction between oxygen and hydrogen. The methanol may be used as fuel containing the hydrogen used for this process. Such fuel cells comprise a very high density of energy, a long life cycle and may be produced at a cost-efficient price.

The fuel tank of this fuel cell 4 comprises a membrane 5, which is arranged at the bottom end of the shell 2. This membrane 5 is installed instead of a mechanical vent and let the fluid or fuel used by the fuel cell pass through and thereby fills or refills the fuel tank of the fuel cell 4. The membrane 5 is structured such, that other fluids like water, sweat etc. do not pass the membrane 5.

This behavior may be achieved by a nanomechanical coating. Instead of a membrane 5, the area of the shell of the fuel cell 4 or the fuel tank respectively may consist of very small openings, which may be structured such, that external fuel will be sucked in by the capilar effect of the openings into the fuel tank. A nanomechanical coating of this area may as well repel other fluids than the fuel to be used in the fuel cell 4. The micro openings may be realized by a woven fabric, made out of a material or coated respectively with a nanomechanical coating resulting in a surface tension with a contact angle greater as 90° for water and smaller as 90° for the fuel fluid.

Figure 2:
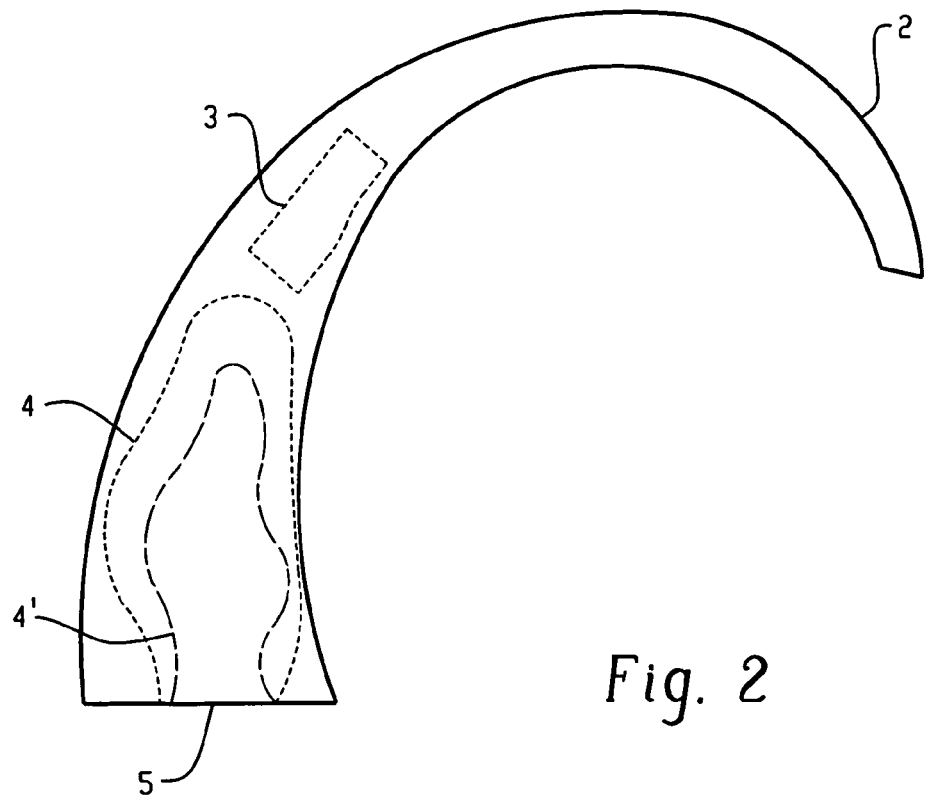
FIG. 2 is a schematical view of a hearing device according FIG. 1 with an alternative fuel cell.

FIG. 2 shows an alternative arrangement of a hearing device with a fuel cell 4 made out of a flexible material. The shape of the fuel cell 4 in its big volume state is shown in dashed lines, whereby its small volume state is shown in dashed-dotted lines 4'.

Figure 3:
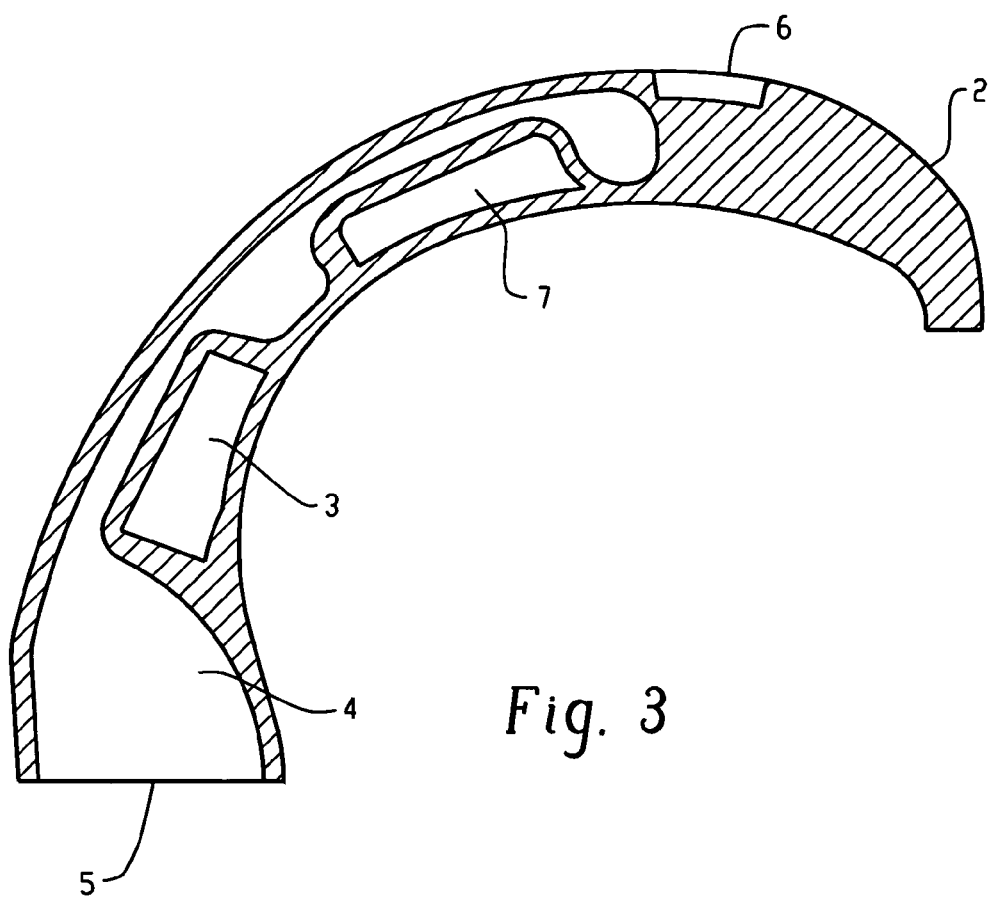
FIG. 3 is a schematical cross sectional view of a hearing device according FIGS. 1 and 2 with another alternative fuel cell.

FIG. 3 shows a further alternative arrangement of a hearing device in a schematical cross sectional view. The signal processing unit 3 is arranged within the shell 2 of the hearing device together with additional electrical components, such as a microphone 6 and an amplifier 7. Those elements are arranged at different locations within the shell 2, thereby leaving unused space within the shell 2. This unused space is now filled out by the irregularly shaped fuel cell 4. This allows achieving a spacious fuel cell 4 with a sufficient capacity to supply all electrical components of the hearing device with its power consuming applications, without the need of increasing the volume of the shell 2 of the hearing device.

The fuel cell 4 may consist of a rigid or a flexible housing.

It has to be noted, that the fuel cell 4 of the shown examples has its fuel tank incorporated in the same housing. It is as well possible, that the fuel cell 4 is separated from it fuel tank, and that the fuel tank consists of a flexible housing and the fuel cell 4 of a rigid housing or any suitable combination thereof.

Figure 4:
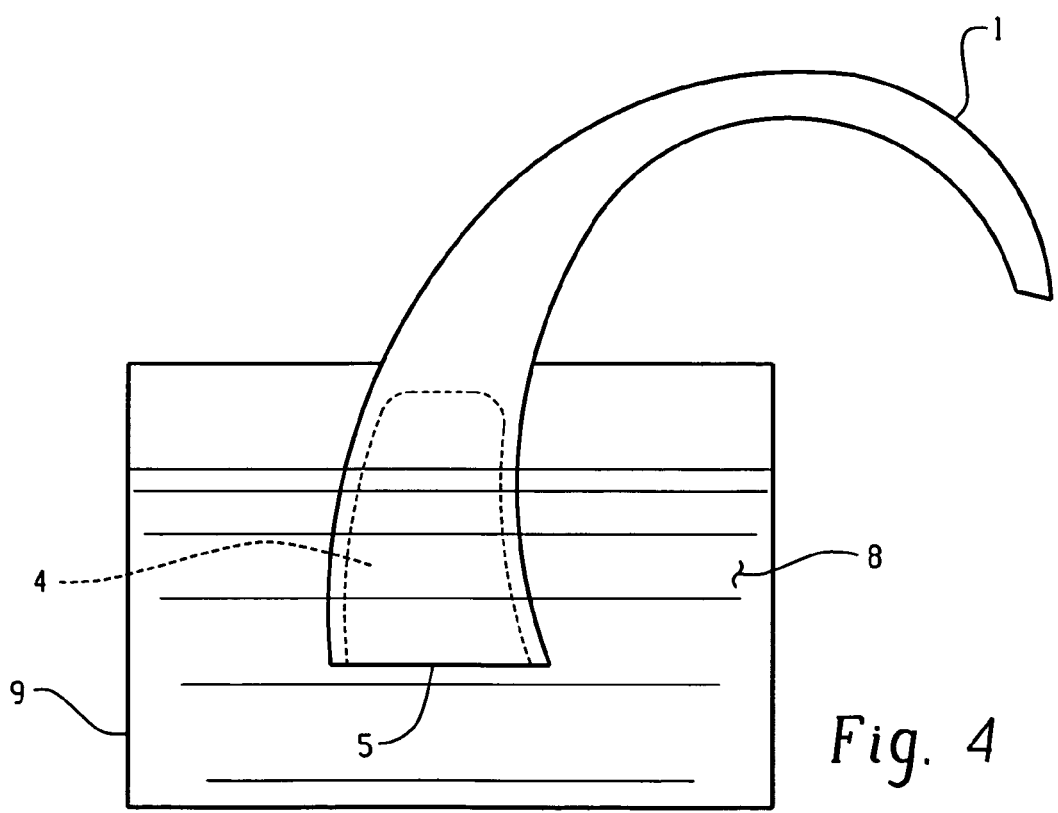
FIG. 4 is a schematical view of a filling arrangement for a hearing device according to the present invention.

FIG. 4 now shows schematically the process of refilling a hearing device 1 according to the present invention. The hearing device 1 is for instance submerged partly into the fuel liquid 8 of a refilling container 9. At least the membrane 5 is fully covered by the fuel liquid 8, which now may penetrate through the membrane 5 into the fuel tank within the fuel cell 4. This refilling process may be performed for instance during the night, when the user of the hearing device 1 may place it into the refilling container 9, as it will regularly not be used during the night.

If for example methanol is used as liquid fuel 8, the part of the hearing device shell 2 that is submerged into the liquid fuel 8 will be cleaned, e.g. from dirt, sweat or oily substances at the same time. It is clear, that the whole hearing device shell 2 may be placed entirely into the liquid fuel 8 to have its entire shell 2 cleaned during the refilling process.

Figure 5:
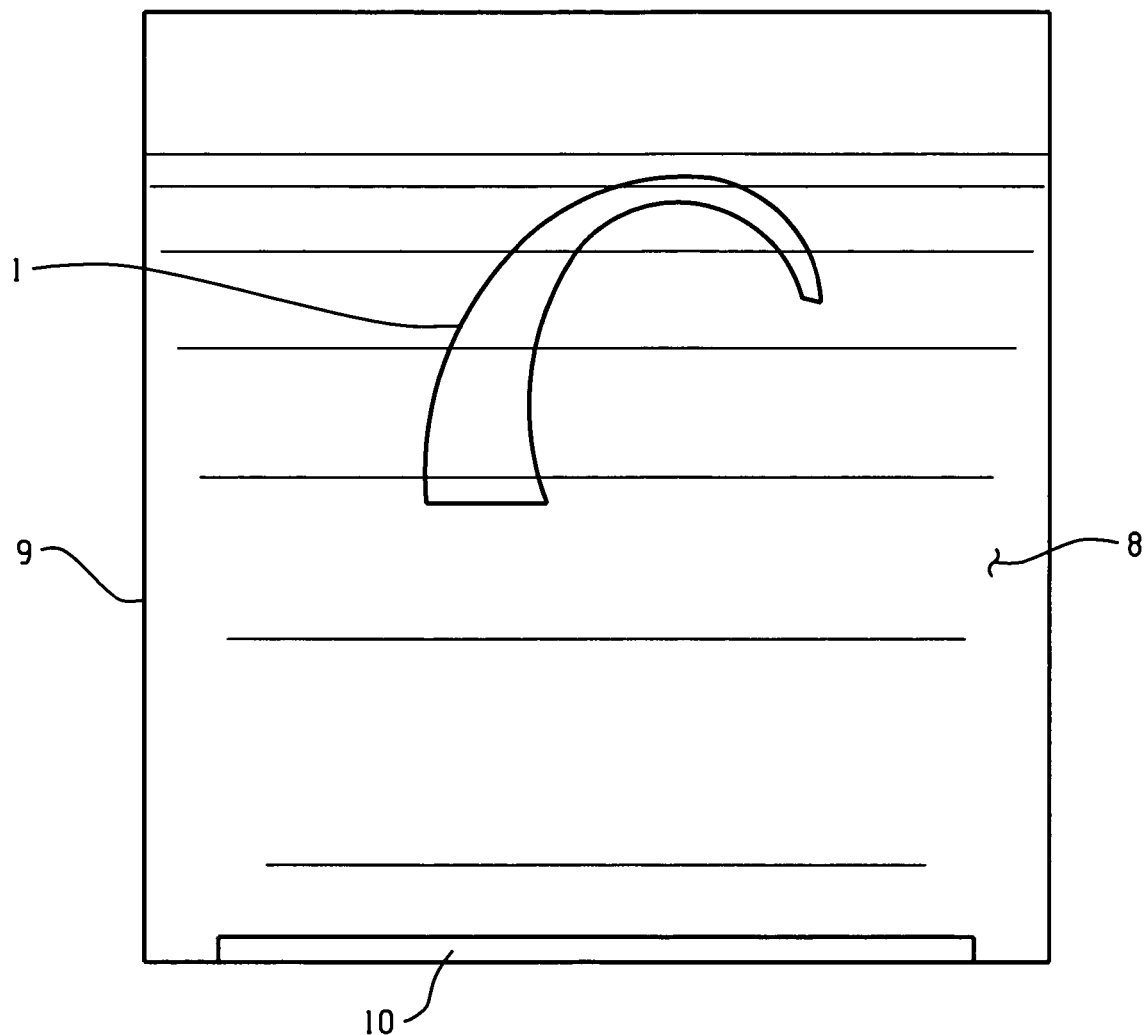
FIG. 5 is a schematical view of an alternative filling arrangement for hearing devices according to the present invention.

FIG. 5 shows an alternative refilling device for refilling a hearing device 1. The refilling container 9 has an ultrasound generator 10 arranged on its bottom. This ultrasound generator 10 helps to remove waste particles from the outside of the hearing device 1 and thereby supports the cleaning process of the fuel 8. The ultrasound generator itself may be powered by any suitable means, e.g. by a battery or accumulator, via a power cord or even by a fuel cell incorporated within the refilling container. In the present example, the hearing device 1 is placed entirely within the fuel 8 of the refilling container 9.

The fuel cell 4 or the fuel tank respectively of the hearing device 1 may be arranged detachable within the shell 2. Thereby it is possible to exchange a used and empty fuel cell 4 by a new or refilled fuel cell 4. The used fuel cell 4 may then be treated by a health care specialist, who may refill and recycle a number of fuel cells together. Therefore, the refilling container 9 may be designed to take up a large number of fuel cell 4 for refilling and cleaning. The fuel cells 4 may antecedent of their delivering been tested by the health care specialist or service center.

I claim:

1. A hearing device comprising at least a signal processing unit and at least a fuel cell to supply the signal processing unit with energy, said fuel cell comprising a fuel tank comprising a volume for storing therein fuel fluid to be used by the fuel cell, whereby said fuel tank comprising a membrane or an area with micro openings to let fuel fluid to be used by the fuel cell pass into the fuel tank.

2. The hearing device according to claim 1, whereby the fuel tank is arranged completely within a shell of the hearing device.

3. The hearing device according to claim 1, whereby at least one of the fuel tank and the fuel cell is arranged detachable from the hearing device.

4. The hearing device according to claim 1, whereby the fuel tank is made of flexible material allowing a shape and/or a volume of the fuel tank to alter.

5. The hearing device according to claim 1, whereby a shape of the fuel tank is irregular, preferably formed to fill out spare spaces or volumes respectively of a shell of the hearing device.

6. The hearing device according to claim 1, whereby the fuel tank is made of a transparent or semitransparent material.

7. The hearing device according to claim 1, wherein the fuel cell comprises a hydrogen-oxygen fuel cell.

8. The hearing device according to claim 1, wherein said membrane or area with micro openings lets fuel fluid to be used by the fuel cell pass into the fuel tank while blocking fluids other than said fuel fluid from entering the fuel tank.

* * * * *